United States Patent
Rafailovich et al.

(10) Patent No.: US 6,905,767 B2
(45) Date of Patent: Jun. 14, 2005

(54) METHOD FOR ENHANCING POLYMER ADHESION USING FILLER PARTICLE MIX AND COMPOSITIONS MADE USING THE METHOD

(75) Inventors: Miriam Rafailovich, Plainview, NY (US); Mordecai Bronner, Cedarhurst, NY (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 10/356,354

(22) Filed: Jan. 31, 2003

(65) Prior Publication Data

US 2003/0176562 A1 Sep. 18, 2003

Related U.S. Application Data

(60) Provisional application No. 60/353,409, filed on Feb. 1, 2002.

(51) Int. Cl.$^7$ .............................. C08K 3/04; C08K 3/36
(52) U.S. Cl. ........................ 428/404; 428/500; 428/519; 428/520; 428/521; 428/522; 524/424
(58) Field of Search ................................. 428/446, 404, 428/500, 519, 520, 521, 522; 524/424

(56) References Cited

U.S. PATENT DOCUMENTS 4,391,941 A * 7/1983 Cotten et al. ............... 524/495
6,020,068 A * 2/2000 Kawazura et al. .......... 428/405
6,070,634 A * 6/2000 Sandstrom et al. ......... 152/564
2003/0114571 A1 * 6/2003 Pan ............................. 524/492

FOREIGN PATENT DOCUMENTS

JP            04-069665      *  3/1993

OTHER PUBLICATIONS

Web Pages for Professor T. W. Zerda (Texas Christian University), 1997 Poster Session "The Effect of Heating and The Cooling Rate on Carbon Black Particles".*
Derwent Abstract for "JP 05–017245", Jan. 1993.*
Derwent Abstract for "JP 09–255900", Jan. 1997.*
Zhang et al., "Effect of Carbon Black and Silica Fillers in Elastomer Blends," *Macromolecules 2001*, 34, pp. 7056–7065 (Aug. 31, 2001).
Raos et al., "Mesoscopic Bead–and–Spring Model of Hard Spherical Particles in a Rubber Matrix. Part I. Hydrodynamic Reinforcement," *Journal of Chemical Physics*, vol. 113, No. 17, pp. 1–10 (Nov. 1, 2000).

* cited by examiner

*Primary Examiner*—D. Lawrence Tarazano
(74) *Attorney, Agent, or Firm*—Hoffmann & Baron, LLP

(57) ABSTRACT

A method of making and polymer compositions with enhanced adhesion that include a rubbery or glassy polymer, about 0.1 to 30% by weight of carbon black filler and from about 0.1 to 5% by weight of carbon filler. Preferred polymers are polybutadiene, brominated isobutylene methylstyrene, polystyrene or polymethylmethacrylate and preferred carbon fillers are colloidal silica, pure graphite particles and a carbon black filler heat treated to an extent sufficient to reduce interaction with the polymer.

34 Claims, 8 Drawing Sheets

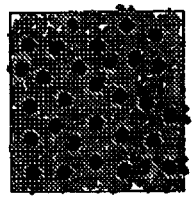
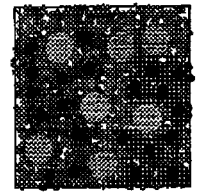
FIGURE 1A  FIGURE 1B  FIGURE 1C
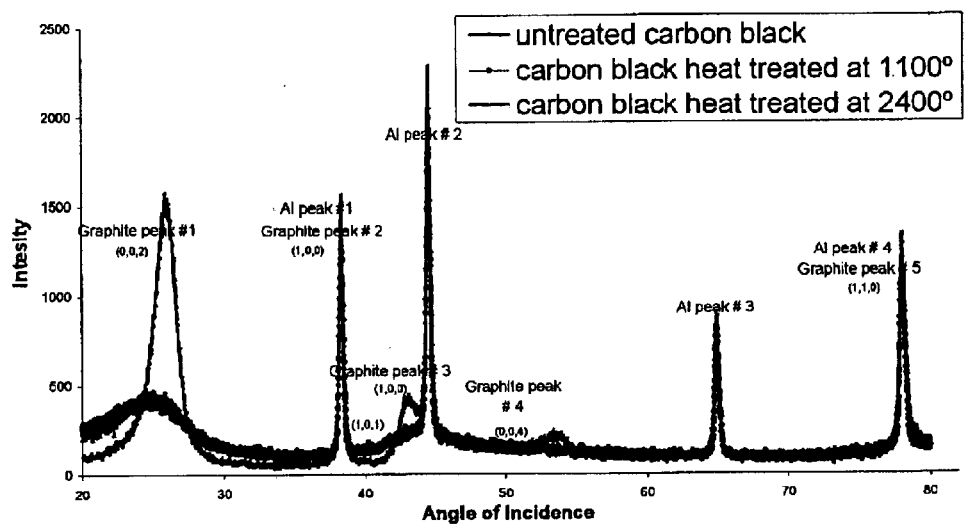
FIGURE 2

| ▲ | 0% silica |
|---|---|
| ■ | 1% hydrophobic silica |
| ● | 2% hydrophobic silica |
| ■ | 3% hydrophobic silica |
| — | 5% hydrophobic silica |
| ■ | 10% hydrophobic silica |
| × | 10% hydrophylic silica |

Carbon Black,
Heat Treated at 1100°C

Carbon Black,
Heat Treated at 2400°C

Untreated Carbon Black

 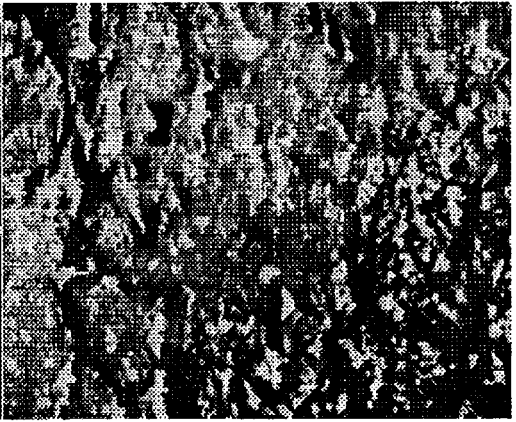
FIGURE 13A            FIGURE 13B
 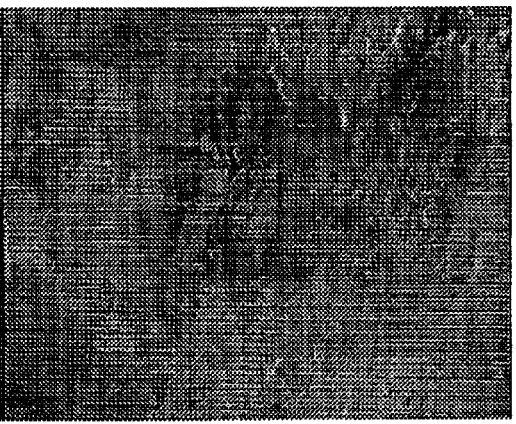
FIGURE 14A            FIGURE 14B

METHOD FOR ENHANCING POLYMER ADHESION USING FILLER PARTICLE MIX AND COMPOSITIONS MADE USING THE METHOD

This application claims priority from U.S. provisional application Ser. No. 60/353,409, filed on Feb. 1, 2002.

BACKGROUND OF INVENTION

The present invention is a method for enhancing the adhesion of a polymer mixture which includes a carbon black filler by adding a second filler. The present invention also relates to compositions having enhanced adhesion which include a polymer mixture, a carbon black filler and a second filler.

Carbon black fillers are frequently added to both rubbery and glassy polymers to increase the modulus and/or the fracture toughness. A major disadvantage of these filled composites is a significant reduction in their adhesion strength with other materials. This makes them difficult to use in multi-component structures, such as rubber tires, where many different types of carbon filled rubbers are layered together. Typical concentrations of carbon black fillers added to tire rubber can be in excess of 30% by weight. The addition of commercially available carbon black fillers to rubbery polymers such as polyolphins (i.e., polybutadiene, brominated isobutylene methylstyrene) and glassy polymers (i.e., polystyrene, and polymethylmethacrylate) can drastically reduce interfacial adhesion. This can cause catastrophic failure in objects composed of multi-component polymer layers. An example is the separation of the tread or the inner liner from other components in rubber tires. The failure is attributed to reduced adhesion which is possibly caused by pinning of polymer chains on the carbon black particle surfaces.

Polymer filler composites are widely used in many applications to provide such properties as hardness, heat resistance and electrical conductivity, simply by varying the filler concentration. In rubbers and other visco-elastic materials, the increase in modulus, $(E-E_o)$, is related to the filler concentration, $\emptyset$, by the Guth Gold Equation.

$$E-E_o = (2.5\emptyset E_o) \tag{1}$$

For example, in order to achieve optimal strength, rubbers in tires have a filler fraction in the range of 20–30% by volume. In glassy polymers, inorganic fillers are known to deflect cracks, hence increasing the fracture toughness.

The present invention overcomes the problems in the prior art using a simple and inexpensive method that can reverse the adverse effects which carbon black fillers have on polymers without affecting the increased modulus provided by the carbon black filler.

SUMMARY OF THE INVENTION

In accordance with the present invention, a method is provided for enhancing polymer adhesion in multilayer structures formed from polymer mixtures that include a carbon black filler. The method includes adding a second filler to a polymer/carbon black mixture to form an enhanced polymer mixture and forming a multilayer structure from the enhanced polymer mixture. The polymer mixture can include a rubbery or glassy polymer, preferably polybutadiene, brominated isobutylene methylstyrene, polystyrene or polymethylmethacrylate. In a preferred embodiment, the multilayer structure is annealed for at least 2 minutes, preferably at least 5 minutes.

In one embodiment of the invention, the polymer mixture includes from 0.1 to 40% by weight of a carbon black filler, preferably from 0.1 to 30% by weight and most preferably from 20 to 30% by weight, and a second filler in an amount of from 0.1 to 5% by weight and, preferably, in an amount of from 1 to 3% by weight. The second filler is a colloidal silica or a carbon filler, preferably pure graphite particles or a carbon black filler which interacts weakly with the polymers in the mixture. A preferred second filler is a carbon black filler heat treated at a temperature of at least 500° C., preferably at least 1100° C. and most preferably at least 2400° C., to an extent sufficient to reduce the interaction with the polymer. The colloidal silica is preferably a hydrophobic silica. The film structures formed from the enhanced polymer mixtures of the present invention have a higher fracture toughness $(G_c)$ than structures formed from similar polymer mixtures which do not include the second filler.

The present invention also provides for compositions which include a polymer, a carbon black filler and a second filler. The polymer is preferably a rubbery polymer or a glassy polymer and most preferably polymethyl methacrylate or polystyrene. The compositions include about 0.1 to 40% by weight of a carbon black filler, preferably about 0.1 to 30%, and most preferably about 20 to 30%. The composition also includes about 0.1 to 5% by weight of a second filler, preferably 1 to 3% by weight and most preferably about 2% by weight. The second filler is a colloidal silica or a carbon filler that can be pure graphite particles or a carbon black filler heat treated to an extent sufficient to reduce interaction with the polymer. The carbon black filler is preferably heat treated at a temperature of at least 500° C., preferably at least 1100° C. and most preferably at least 2400° C.

In a preferred embodiment, an adhesive glaze is formed by mixing the carbon black filler and the second filler with a polymer. The glaze is applied as a thin film and is used to adhere two adjoining layers in a multilayer film or polymer structure. The two layers adjoining the glaze are preferably from 500 Å to 2500 Å in thickness. The polymers used in the glazes are compatible with at least one of the polymers in the two adjoining layers. Preferably, the polymers in the glazes are the same as at least one of the polymers in the adjoining layers.

The compositions of the present invention can be used to form multilayer polymer structures. These structures have a first layer that includes a first polymer; a second layer that includes a second polymer; and an adhesive layer formed from the compositions of the present invention. The adhesive layer is disposed between the first and the second layer and includes 0.1 to 40% by weight of a carbon black filler, preferably 0.1 to 30% by weight, and most preferably 20 to 30% by weight, 0.1 to 5% by weight of a carbon filler or a colloidal silica, preferably 1 to 3% by weight, and a third polymer. The third polymer can be the same as the first polymer or the second polymer. Preferably, at least one of the three polymers is polybutadiene, brominated isobutylene methylstyrene, polystyrene or polymethylmethacrylate. The carbon filler is preferably pure graphite particles or a heat treated carbon black filler that is heat treated to an extent sufficient to reduce interaction with the third polymer. In a preferred embodiment the multilayer polymer structure is annealed, preferably for at least 2 minutes and most preferably for at least 5 minutes.

The compositions of the present invention can be used in multilayer structures and films, preferably as an adhesive layer, or as a glaze. Preferred polymers for use in the compositions of the present invention are rubbery polymers such as polyolphins (i.e., polybutadiene, brominated isobutylene methylstyrene) and glassy polymers (i.e., polystyrene, and polymethylmethacrylate). The most preferred polymers are polymethyl methacrylate and polystyrene.

BRIEF DESCRIPTION OF THE FIGURES

Other objects and many attendant features of this invention will be readily appreciated as the invention becomes better understood by reference to the following detailed description when considered in connection with the accompanying drawings wherein:

FIG. 1A shows elastomer freely bound to an attractive surface.

FIG. 1B shows a carbon black filler elastomer.

FIG. 1C shows a carbon black and colloidal silica filler elastomer.

FIG. 2 is a graph showing the intensity versus angle of incidence for an x-ray diffraction test of carbon black on an aluminum substrate.

FIGS. 13A and 13B show topography and lateral force images of a bare PS/PS interface following fracture.

FIGS. 14A and 14B show the scanning probe microscopy scans for the interface between polystyrene layers (PS/PS) where 30% by weight untreated carbon black was added to the polystyrene.

DETAILED DESCRIPTION OF THE INVENTION

Figure 3:
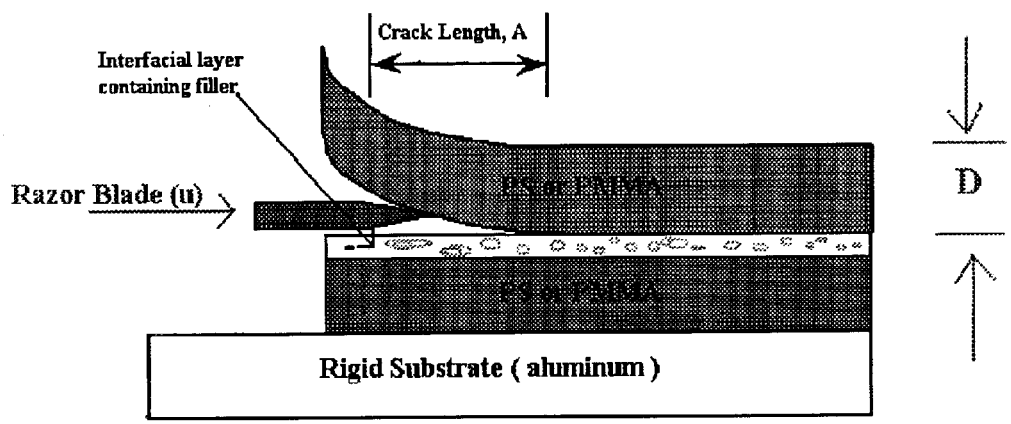
FIG. 3 is a diagram showing the asymmetric double cantilever beam method for testing the fracture toughness of an interface between glassy polymers.

The present invention overcomes the problems experienced when carbon black fillers are added to polymers by mixing the carbon black filler with a second filler which counteracts the reduced adhesion caused by the carbon black filler. The second filler can be colloidal silica or pure graphite particles in an amount of less than 10% by weight of the carbon black filler/second filler mixture and preferably less than 3% by weight. In addition, carbon black fillers that interact with the polymer to only a limited extent can be used as the second filler. Such secondary carbon black fillers are preferably heat treated carbon black.

The second filler can be added to a polymer/carbon black mixture to form an enhanced polymer mixture. The enhanced mixture can then be formed into layers or a film structure using well known methods, such as coextrusion. In one embodiment, a film structure having enhanced adhesion is formed by adding the second filler, preferably 0.1–3% by weight, most preferably about 2% by weight of a colloidal silica, to a mixture comprising a glass polymer and 0.1–30% by weight, preferably 25% by weight of a heat treated carbon black to form an enhanced mixture. The enhanced mixture is extruded to form a film structure which is then annealed for at least 2 minutes, preferably at least 5 minutes.

A thin film (i.e., a glaze) made from the enhanced mixture can also be applied as an adhesive between two adjoining layers, preferably polymer layers in a multilayer structure. The addition of the second filler to the polymer/carbon black mixture greatly improves the surface adhesion of the enhanced mixture without any significant change in the bulk properties of the filled material. Both colloidal silica and graphite interact far more weakly with the polymer matrix. This allows a small fraction of the polymer chains to be mobile and migrate to the interface. These chains can then diffuse across the interface and improve the adhesion or fracture toughness.

One of the advantages of the present invention is that it reverses the adverse effects on adhesion caused by large fractions of carbon black filler in a polymer mixture. The amount of second filler added is small in comparison to the amount of carbon black filler and the second filler has a negligible impact on the enhancement of the modulus of the polymer that is imparted by large concentrations of carbon black. By appropriately adjusting the interaction, interdiffusion can also be totally blocked. This enables the manufacture of coatings that completely protect surfaces from unwanted adhesion.

The present invention also works with mixtures of carbon black particles. In this embodiment, the second filler is a carbon black which interacts weakly with the polymers in the mixture. Preferably, the carbon black of the second filler is heat treated to at least 1100° C., preferably 2400° C. This provides an improvement in adhesion without affecting the surface electrical properties of the materials.

In addition to increasing the modulus or fracture toughness, large concentrations of carbon black are often mixed into polymers to enhance the electrical conductivity. Enough carbon is added to a polymer or mixture of polymers to produce a percolated or connected phase. In this case, the addition of even a small amount of colloidal silica filler can degrade the electrical properties if the silica blooms to the surface of the composite. This problem is overcome in an embodiment of the present invention by mixing small amounts of graphite particles, instead of silica, with the polymer. The graphite particles, unlike colloidal silica filler do not disturb the electrical properties.

When polymers are in the vicinity of an attractive interface, the chain dynamics and the local viscosity can be decreased by more than two orders of magnitude. This can severely hinder adhesion with other polymers since adhesion requires adequate chain mobility to promote interpenetration between polymer interfaces. The inclusion of fillers in a polymer provides for a large increase in the interfacial area with an inorganic surface. Hence, by tailoring the interactions with the surface of the filler, one can in principal vary adhesion and other surface properties without significantly changing the bulk modulus.

The present invention controls the self-adhesion or interfacial fracture toughness between glassy polymers by the addition of inorganic fillers and filler mixtures. Total suppression of adhesion, even above the glass transition, can be accomplished with the addition of inorganic particles with appropriate surface functional groups. It has been found that the rate of adhesion can be controlled by tailoring the surface interactions between filler and matrix. In addition, it has been found that adhesion and bulk modulus can be controlled separately by using mixtures of fillers in specified concentrations.

Another technique used to improve adhesion includes coating the filler particles with an inert organic surfactant. The surfactants will interact with hydrophobic polymers mainly via weak van der Waals interactions. An example of this type of coated particle is AEROSIL® R812 which consists of fused silica having a surface modified with Silamine 1,1,-Trimethyl-N-(Trimethyl-Silyl).

Explanation of The Effect of Mixed Fillers

FIGS. 1A–C show an untreated polymer, a polymer treated with carbon black and a polymer treated with carbon black and colloidal silica. FIG. 1A shows an elastomer bound to an attractive surface such as PS or PMMA. The polymer chains are substantially free from adhesion. FIG. 11B shows an elastomer when carbon black is introduced. The carbon black filler interacts strongly with the polymer producing an effective cross-linked matrix. This results in a "strangulated" elastomer. FIG. 1C shows an elastomer treated with carbon black and colloidal silica filler. The polymer associated with the colloidal silica particles are only weakly bound and hence mobile. Entropy drives these polymer chains and particles to move outside of the confining cross-linked matrix. Accordingly, the addition of only a few percent of silica can reverse the adverse effects of carbon black on interfacial adhesion. The amount of silica added is so small that no change in bulk modulus is observed.

Scanning Probe Microscopy (SPM)

In several of the examples below, Scanning Probe Microscopy (SPM) was used to measure the topography and the roughness (friction analysis) of the interfaces. SPM covers several related technologies for imaging and measuring surfaces on a fine scale, down to the level of molecules and groups of atoms. One of the most common scanning probe techniques is Atomic Force Microscopy (AFM) which uses an atomic force microscope to measure the interfaces. An atomic force microscope is an instrument used for studying surface properties of materials at the atomic to micron level. AFM can be used to investigate a variety of materials which include thin and thick film coatings, ceramics, composites, glass, synthetic and biological membranes, metals, polymers and semiconductors. AFM can be used to image surfaces at atomic resolution as well as to measure forces at nano-newton scale. The AFM probes the surface of a sample with a sharp tip which is a couple of microns long and less than 100 Å in diameter. Tips are typically made from $Si_3N_4$ or Si and are located at the free end of a cantilever 100 to 200 $\mu$m long. Forces between the tip and the sample surface cause the cantilever to bend, or deflect. A detector in the AFM head measures the cantilever deflection as the tip scans the surface of the sample. The force commonly associated with AFM is the van der Waals' force. A computer generates a map of the surface topography from the measured cantilever deflection.

The materials used in the examples are summarized in the tables below.

TABLE 1

Description Of Polymers Used In Glazing Film

| Polymer | Weight Average Molecular Weight | Molecular Weight Distribution |
| --- | --- | --- |
| Polymethyl methacrylate (Polymer Laboratories) | Mw = 120,000 | Mw/Mn = 1.10 |
| Polystyrene (Pressure Chemical) | Mw = 207,000 | Mw/Mn = 1.05 |
| Deuterated Polymethylmethacrylate (Polymer Laboratories) | Mw = 64,000 | Mw/Mn = 1.20 |
| Polymethyl methacrylate (polydisperse)-(Aldrich Chemical Company) | Mw = 120,000 | — |
| Polystyrene (Aldrich Chemical Company) | Mw = 280,000 | — |

TABLE 2

Summary Of Fillers Mixed With Polymers In Films

| Filler Type and Maufacturer | Description | Treatment |
| --- | --- | --- |
| Carbon Black (Cabot) | N299 | None |
| Carbon Black (Cabot) | N299 | Heated to 1100° C. |
| Carbon Black (Cabot) | N299 | Heated to 2400° C. |
| Colloidal silica (Aerosil) | R812 | Surface modified with Silamine 1,1,-Trimethyl-N-(Trimethyl-Silyl) |

The effect of thermal treatment on the structure of the carbon black particles was examined using x-ray diffractions (XRD) on an aluminum substrate. The x-ray intensity as a function of scattering angle is plotted in FIG. 2 for the three types of carbon black used (untreated carbon black, carbon black heat treated at 1100° C. and carbon black heat treated at 2400° C.). Table 3 lists the Bragg peaks for Graphite and Aluminum. These peaks were determined using Bragg's Law which is based on the equation:

$$n\lambda = 2d \sin \theta \qquad (2)$$

This equation was derived to explain why the cleavage faces of crystals appear to reflect X-ray beams at certain angles of incidence (theta, θ). The variable d is the distance between atomic layers in a crystal, the variable lambda λ is the wavelength of the incident X-ray beam and n is an integer.

TABLE 3

Bragg Peaks Of Aluminum And Graphite

| Material | Peaks (Angle of Incidence) | | | | |
|---|---|---|---|---|---|
| Graphite | 26.37 | 42.65 | 44.87 | 54.28 | 77.62 |
| Aluminum | 38.45 | 44.95 | 65.09 | 78.11 | xxxxx |

Test results can be compared to the spectra in FIG. 2 and the peaks corresponding to the aluminum sample holder can be identified in each spectra. These peaks are sharp, indicating the highly crystalline nature of the aluminum as they exist in the (h, l, k) lattices cube. The spectra for carbon black that is untreated or treated at 1100° C. shows one broad peak at an angle of 26.4 degrees. This position is close to the peak of graphite. The peak intensity is low and it is very broad indicating a low degree of crystallinity as reported previously. The spectra for carbon black heated to 2400° C. is dramatically different. Sharp peaks are observed at 26°, 44° and 54°, which correspond in position and intensity to the Bragg peaks expected for graphite crystals. Hence, heat treatment at high temperatures greatly increases the crystalline fraction in the particles.

The Asymmetric Double Cantilever Beam Method (ADCB)

The fracture toughness of the interface was measured using the Asymmetric Double Cantilever Beam Method (ADCB) (see, Brown, H. R et al., Macromolecules, 1999, 32, 6254–6260) for testing the fracture toughness of an interface between glassy polymers (FIG. 3). The Asymmetric Double Cantilever Beam test method calculates the fracture toughness, $G_c$, based upon the steady state crack length, a, when a razor blade of thickness u is driven into the interface at constant velocity. This test is well adapted for the measurement of the fracture toughness ($G_c$) of a weak or moderately strong interface between two slabs of solid polymers. It is based on a balance between the stored elastic energy in a slab and the energy necessary to propagate a crack at the interface between the two polymers. During an experiment, the wedge (i.e., razor blade) is typically pushed at a constant velocity and the crack length, a, is measured with a video camera mounted above the sample. If both elastic moduli are known, the fracture energy can be directly obtained from the value of a. The crack length is easily measured if at least one of the two polymers is reasonably transparent.

A measurement of the fracture toughness is made by molding two separate slabs of polydisperse, commercial grade polymer in a hot press. The fillers are introduced in one of two ways:

1) The surface of one of the slabs is "glazed" with a thin (1000 Å) film of monodisperse polymer where the filler, or materials to be tested are added. Surface glazing is usually performed when monodisperse test samples are used to save on cost ($1000/gram).
2) The fillers are mixed into the polymers using a Brabender twin screw extruder at 170° C. The ADCB test was performed on one test sample prepared entirely from monodisperse polymer and the results were substantially the same as those obtained by "glazing." Accordingly, all the other samples were glazed in order to save on the cost of the experiments.

The two slabs are then recombined in the hot press for various times at fixed temperature, glued to a rigid metal plate and mounted in the testing device. A razor blade is inserted at the joint and a crack is propagated along the interface. The length of the crack is then measured and the fracture toughness, or the energy per unit area required to break the interface, is determined using equation (3):

$$G_c = \frac{3u^2 \, ED^3}{8 \, a^4 [1 + 0.64(D/a)]^4} (J/m^2) \quad (3)$$

In this equation, u is the wedge thickness or the thickness of the razor blade, E is Young's modulus of the top layer, D is the thickness of top layer, and a is the crack length.

Between 3 to 6 sets of 10 measurements each were taken for each sample. The mean of 30 to 60 measurements was taken to determine the crack length, a, which is inserted into equation (3) to obtain $G_c$, or the fracture toughness.

Scanning Probe Microscopy of the Fracture Interface

There are two main modes of fracture when the razor blade is inserted. When the interface is strong, i.e., $G_c$~200 J/m², the energy released upon fracture is great, the crack propagates via crazing. In order for crazing to occur, the polymer chains must be entangled across both sides of the interface.

When the interfacial energy is small, the mechanism of fracture is usually chain pull out. The chains are temporarily elastically deformed as they pull out from the other side of the interface. The surface remains rigid and the polymer chains provide minimal resistance to the Scanning Probe Microscopy (SPM) tip. These effects can be observed using two types of scanning force microscopy, lateral force and thermal microscopy.

EXAMPLES

The examples set forth below serve to provide further appreciation of the invention but are not meant in any way to restrict the scope of the invention.

Example 1

Suppression of Adhesion

The samples were prepared by first forming two slabs of polymethyl methacrylate (PMMA) for each sample. One set of samples was then formed by glazing the surface of one of the PMMA slabs with a thin film (approximately 1000 Å thick) of polymethyl methacrylate with no colloidal silica. When the two slabs of PMMA were placed in contact with each other, the thin film of polymer acted as an adhesive layer. A second and third set of samples were prepared in a similar manner and 5% and 10% by weight colloidal silica, respectively, was added to the samples. The fracture toughness, $G_c$, of the interfaces of each of the samples was then tested using the Asymmetric Double Cantilever Beam Method. The results are shown in FIG. 4.

Figure 4:
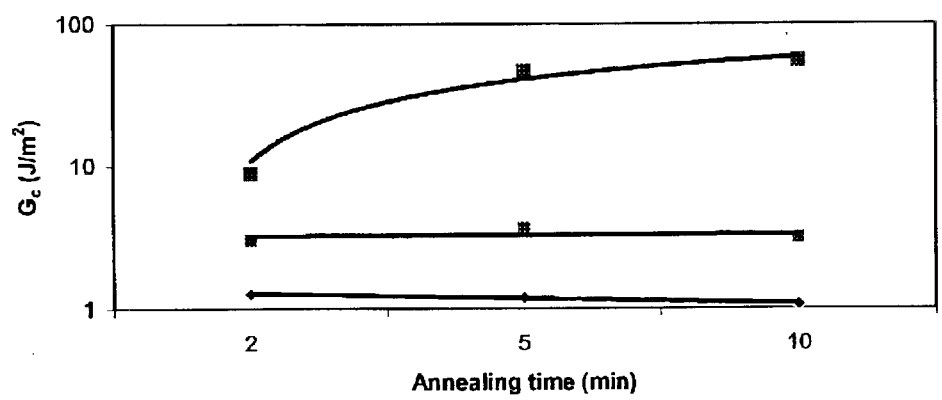
FIG. 4 is a graph which plots the fracture toughness as a function of annealing time for the interface between polymethyl methacrylate layers (PMMA/PMMA) where varying amounts of colloidal silica are added to the layers.

In FIG. 4, the fracture toughness is plotted as a function of annealing time for the PMMA/PMMA interfaces. FIG. 4 shows that without silica, the fracture toughness increases with annealing time as expected. The addition of as little as 5% by weight of colloidal silica decreases the fracture toughness by two orders of magnitude after 10 minutes of annealing. The adhesion of the samples shown in FIG. 4 containing 5% and 10% by weight colloidal silica does not increase with greater annealing time. In contrast, the adhesion of the PMMA/PMMA sample without colloidal silica does increase with greater annealing time.

The mechanism that suppresses adhesion is the reaction between the octadecyltrichlorosilane, OTS ($CH_3[CH_2]_{17}SiCl_3$), coating on the colloidal particles and the OH groups on the PMMA. This makes a cross-linked membrane at the surface of the PMMA which prevents interdiffusion between the slabs when melted above the glass transition temperature, Tg. Hence, suppression of adhesion. With increased annealing time, the number of groups reacting is increased and hence there is a very slight reduction in $G_c$.

FIG. 4 shows that applying a 1000 Å thick constant 5% by weight colloidal Si coating on PMMA prevents a component from adhering to another material.

Example 2

Control Of Adhesion With Annealing Time

For this example, slabs of polystyrene (PS) were formed and PS/PS samples were prepared with a thin layer of polystyrene glazed onto the surface of one of the slabs. Three sets of samples were prepared; the first set had a glaze which contained untreated carbon black, the second and third sets of samples had glazes with carbon black treated at 1100° C. and 2400° C., respectively, for 90 minutes. The amount of carbon black in the samples varied in increments of 5% from 0% to 30% by weight for each of the three sets of samples. Each of the samples was annealed for 2 minutes. The fracture toughness, $G_c$, was measured for each sample and the results are shown in FIG. 5.

Figure 5:
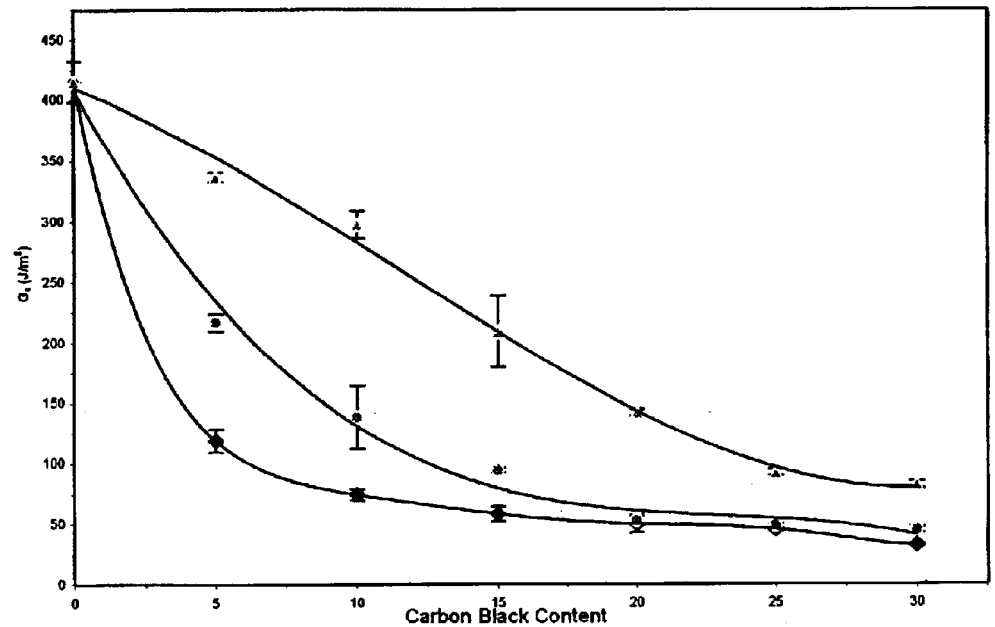
FIG. 5 is a graph which plots the fracture toughness as a function of carbon black content for the interface between polystyrene layers (PS/PS) where heat treated and untreated carbon black are added to the layers.

FIG. 5 shows that the fracture toughness decreases drastically with carbon black content. The middle curve in FIG. 5 corresponds to the fracture toughness, $G_c$, when the carbon black was heat treated to 1100° C. FIG. 5 shows that the decrease in $G_c$ is still large, but slightly more gradual with increased carbon black concentrations. At 5% by weight carbon black content, fracture toughness, $G_c$, is ~220 $J/m^2$, which is about twice the value of the untreated carbon. The largest effect though is clearly seen to occur when carbon black, heat treated to 2400° C. is added. At 5% carbon black content, $G_c$ is only slightly decreased to ~350 $J/m^2$. Thus, concentrations of less than 10% by weight of carbon black heat treated at 2400° C. decrease the adhesion in a polymer mixture less than other types of carbon black.

Example 3

For this example, four sets of PS/PS interface samples were prepared in a manner similar to Example 2. The glazes in the different sets of samples contained no carbon black and 30% by weight concentrations of untreated carbon black, carbon black treated at 1100° C. for 90 minutes and carbon black heat treated at 2400° C. for 90 minutes. The fracture toughness, $G_c$, for each of the samples was measured for various annealing times between 0 and 10 minutes. The results are shown in FIG. 6.

Figure 6:
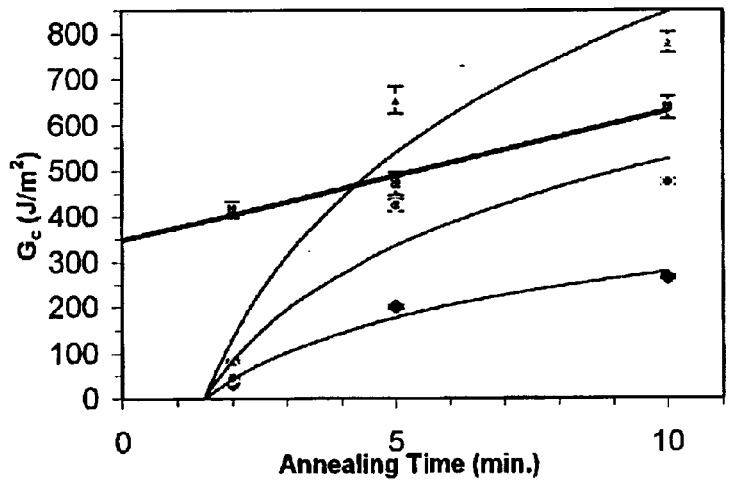
FIG. 6 is a graph which plots the fracture toughness as a function of annealing time for the interface between polystyrene layers (PS/PS) with carbon black at a concentration of 30% by weight and varying annealing times.

FIG. 6 shows the fracture toughness, $G_c$, of the PS/PS interface samples with no carbon black and different carbon blacks at a concentration of 30% by weight for varying annealing times. The flat curve in FIG. 6 is the fracture toughness of a bare PS/PS interface, i.e., an interface formed without a carbon black filler. FIG. 6 shows that the fracture toughness, $G_c$, for all interfaces increases monotonically with time.

For the PS/PS interface samples containing carbon black heat treated at 2400° C. for 90 minutes, the fracture toughness exceeds the fracture toughness for the set of samples that have no carbon black after only 5 minutes of annealing. At longer annealing times, the adhesion recovers and the fracture toughness of the samples containing heat treated carbon black (2400° C.) surpasses the linear PS/PS system without carbon black and improves adhesion. The change is more drastic at higher concentrations of carbon black as shown in Example 4.

Example 4

For this example, three sets of samples were prepared in the same manner as in Example 2. The amount of carbon black in the samples varied in increments of 5% from 0% to 30% by weight for each of the three sets of samples. The sole difference was that the samples were annealed for 5 minutes instead of 2 minutes. The fracture toughness, $G_c$, was measured for each sample and the results are shown in FIG. 7, which plots the fracture toughness versus carbon black content.

Figure 7:
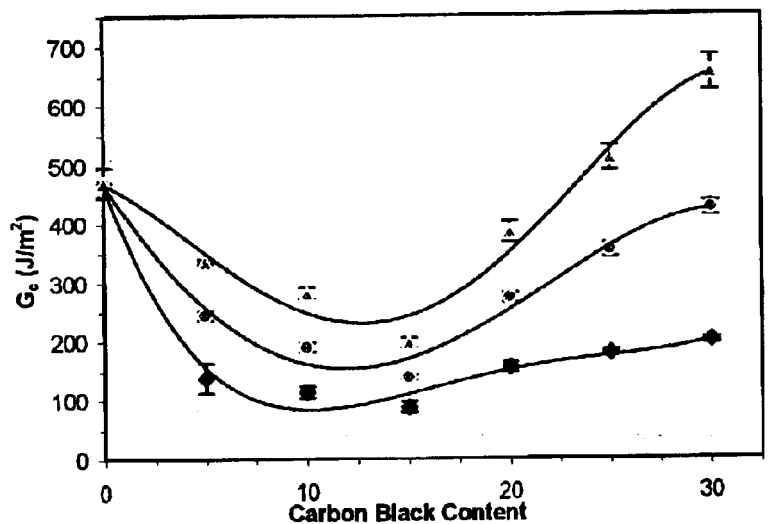
FIG. 7 is a graph which plots the fracture toughness as a function of carbon black content for the interface between polystyrene layers (PS/PS) with carbon black at varying concentrations and annealed for five minutes.

FIG. 7 shows the fracture toughness of the PS/PS interface with varying amounts of carbon black annealed for 5 minutes. FIG. 7 shows that the addition of carbon black decreases the fracture toughness for carbon black concentrations up to about 20% by weight. The competing effects of increased modulus and decreased dynamics actually produces a minima in the fracture toughness. This is most pronounced with the heat treated carbon black shown in FIG. 7.

Example 5

Figure 8:
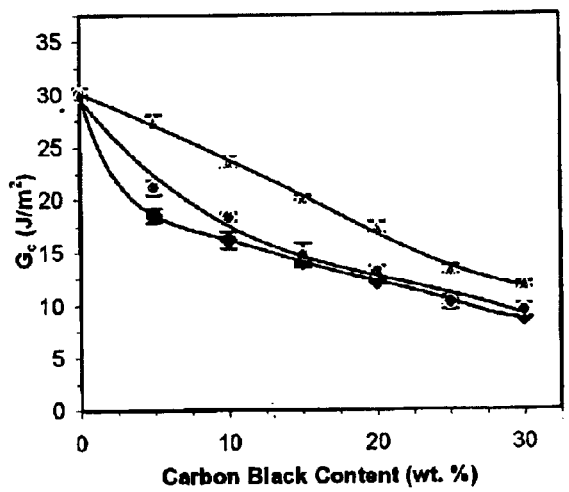
FIG. 8 is a graph which plots the fracture toughness as a function of carbon black content for the interface between polymethyl methacrylate layers (PMMA/PMMA) with varying concentrations of carbon black and annealed for two minutes.
Figure 9:
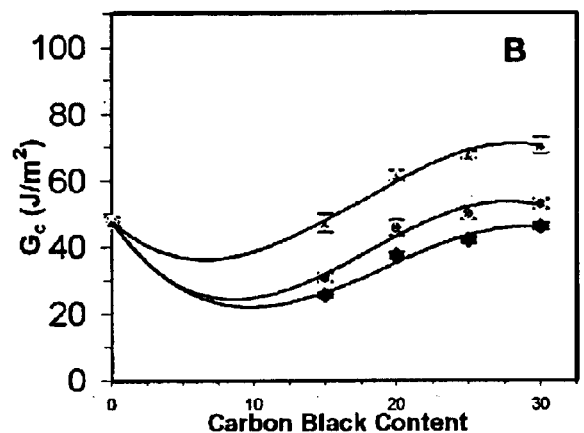
FIG. 9 is a graph which plots the fracture toughness as a function of carbon black content for the interface between polymethyl methacrylate layers (PMMA/PMMA) with varying concentrations of carbon black and annealed for five minutes.

The samples for this example had a PMMA/PMMA interface and were prepared in a manner similar to Example 2. Six sets of samples were prepared. The first set had a PMMA glaze which contained untreated carbon black, the second set had a glaze with carbon black heat treated at 1100° C. for 90 minutes and the third set had a glaze with carbon black heat treated at 2400° C. for 90 minutes. The amount of carbon black in the samples varied in increments of 5% from 0% to 30% by weight for each of the three sets of samples. Each of the samples was annealed for 2 minutes. The fracture toughness, $G_c$, was measured for each sample and the results are shown in FIG. 8. Three other sets of samples were prepared in an identical manner except they were annealed for 5 minutes instead of 2 minutes. The fracture toughness, $G_c$, was measured for each sample and the results are shown in FIG. 9.

The results for the PMMA/PMMA system are similar to the results for the PS/PS system shown in FIGS. 5 and 7. However, the absolute values of the fracture toughness of the PMMA/PMMA system for the same joining time are smaller since the viscosity of PMMA is higher than that of PS. FIGS. 8 and 9 show the fracture toughness of the PMMA/PMMA interface with varying amounts of carbon black. FIG. 8 shows the fracture toughness, $G_c$, after 2 minutes of annealing and FIG. 9 shows the fracture toughness after 5 minutes of annealing. The fracture toughness is significantly increased by increasing the annealing time.

Example 6

For this example, four sets of samples were prepared using PS/PS slabs and different PS glazes. The PS glazes for the four sets contained 0% carbon black, 30% by weight untreated carbon black, 30% by weight carbon black treated at 1100° C. for 90 minutes and 30% by weight carbon black treated at 2400° C. for 90 minutes. Each of the four sets of samples included five samples having 0%, 1%, 2%, 3% and 5% by weight of hydrophobic silica. The fracture toughness, $G_c$, was measured for each sample and the results are shown in FIG. 10.

Figure 10:
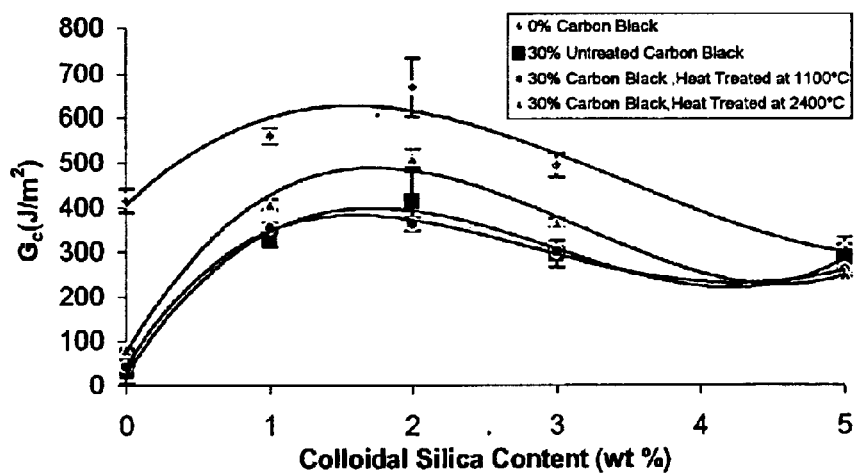
FIG. 10 is a graph which plots the fracture toughness as a function of colloidal silica content for the interface between polystyrene layers (PS/PS) with varying concentrations of colloidal silica and 30% by weight carbon black at the interface.

The effect of adding colloidal silica to carbon black on fracture toughness, $G_c$, is shown in FIG. 10, where $G_c$ is plotted as a function of colloidal silica concentration for PS/PS slabs with PS glazing films containing 30% by weight of different carbon blacks. The upper-most curve is the control specimen which does not contain any carbon black. The second curve from the top is for the samples containing carbon black treated at 2400° C. The bottom two curves are for samples containing untreated carbon black and carbon black treated at 1100° C., with the curve for the untreated carbon black above the curve for the 1100° C. treated carbon black between silica concentrations of 1 to 3 weight percent.

FIG. 10 shows that, in the absence of colloidal silica, fracture toughness, $G_c$ is very weak in all samples that contain carbon black. The addition of only 1% by weight colloidal silica particles produces a dramatic increase in fracture toughness from approximately $G_c$~50 J/m$^2$ to $G_c$~400 J/m$^2$ which is only 20% less than $G_c$~500 J/m$^2$ for the control sample. The $G_c$ increases as colloidal silica is added and a maximum $G_c$ is provided at about 2% by weight colloidal silica. $G_c$ gradually decrease at higher concentrations.

A maximum in the $G_c$ curve occurs at 2% by weight colloidal silica even in the absence of carbon black. It has been observed that well dispersed colloidal silica are effective in reinforcing the interface and deflecting the crack propagation. At higher concentrations of silica particles in PS, films can form large aggregates. These aggregates may not be as effective in reinforcing the interface since they have poor surface to volume ratios.

Example 7

For this example, three sets of samples containing different types of carbon black (untreated carbon black and carbon black treated at 1100° C. and 2400° C. for 90 minutes) were prepared in a manner similar to Example 6 except that the carbon black content for each of the three types of carbon black tested was varied in increments of 5% from 0% to 30% by weight. In addition, various concentrations of colloidal silica were added to the different carbon blacks. The fracture toughness, $G_c$, was measured for each sample and the results are shown in FIGS. 11A–C.

Figure 11A:
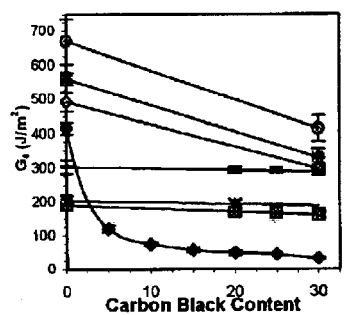
FIGS. 11A–C are graphs which plot the fracture toughness as a function of carbon black content for the interface between polystyrene layers (PS/PS) with varying concentrations of colloidal silica and untreated and treated carbon black.
Figure 11B:
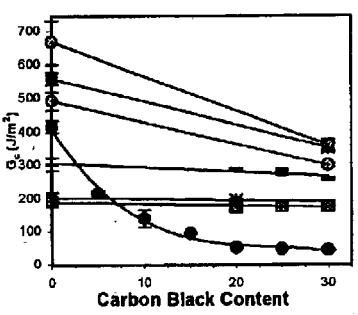
Figure 11C:
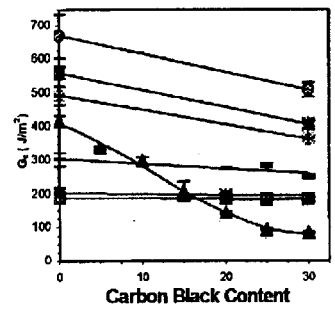

In FIGS. 11A–C, fracture toughness, $G_c$, for a PS/PS interface is plotted versus carbon black concentration for three types of carbon black with different amounts of added colloidal silica. FIGS. 11A and 11B show the results for carbon black treated at 1100° C. and 2400° C., respectively and FIG. 1C shows the results when untreated carbon black is used. The curves in FIGS. 11A–C from top to bottom are for samples having 2% hydrophobic silica, 1% hydrophobic silica, 3% hydrophobic silica, 5% hydrophobic silica, 10% hydrophylic silica, 10% hydrophobic silica and 0% silica, in that order. In each case, the addition of silica produced values of $G_c$ that were larger than those of the PS/PS interface without carbon black (i.e., the points plotted on the y-axis for 0% carbon black content). For colloidal silica concentrations larger than 3% by weight (the value at the maximum fracture toughness), fracture toughness is almost insensitive to the carbon black concentration whereas for concentrations less than and equal to 3% by weight, fracture toughness decreases monotonically with carbon black concentration.

Example 8
Mixtures of Carbon Black Particles

Figure 12:
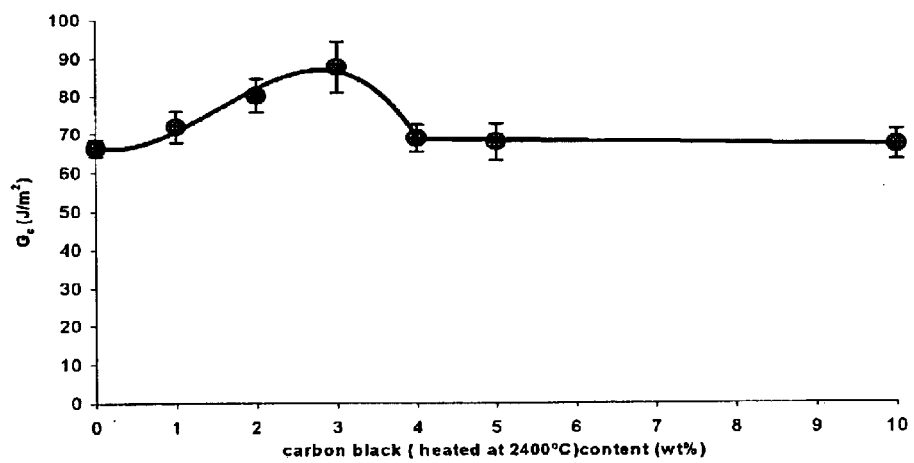
FIG. 12 is a graph which plots the fracture toughness as a function of colloidal silica content for the interface between polystyrene layers (PS/PS) with varying concentrations of heat treated carbon black, annealed for two minutes.

FIG. 12 shows the fracture toughness of a set of samples with 20% by weight untreated carbon black particles plotted as a function of concentration of the 2400° C. graphite particles that were added. Each of the samples was annealed for 2 minutes. Carbon reinforced polymers are frequently designed with specific electronic conductivity properties. Therefore, the addition of even small amounts of silica may adversely affect these properties. In particular, since the silica "blooms" to the surface, it may adversely affect the electrical contact behavior. Experiments with mixtures of carbon black particles were conducted and it was found that carbon black particles heat treated to 2400° C. interacted only weakly with the polymer. This discovery led to mixing small amounts of carbon black particles heat treated to 2400° C. with the more strongly interacting untreated carbon black particles. FIG. 12 shows that this results in an effect similar to that of colloidal silica.

Example 9

When polymer chains are stretched to the point of rupture, they flow and are no longer glassy. Hence, they become soft and allow the SPM tip to penetrate deeper. This manifests itself as an apparent increase in frictional drag on the tip. When the interface is glassy, the SPM tip slips across the surface since the tip penetration is much smaller. FIGS. 13A and 13B are the Atomic Force Microscopy (AFM) analysis of PS/PS interface with no fillers added. FIG. 13A shows the topography and FIG. 13B shows the lateral force images (i.e., friction or roughness analysis) of a bare PS/PS interface following fracture after annealing for 2 min. In this case, $G_c$=415.6 J/m$^2$ which is large enough for crazing to have occurred. FIG. 13A shows that the topography is rough. FIG. 13B shows that there is large frictional contrast across the ridges. The ridges appear to have higher friction than the valleys since the locus of largest deformation is where the break occurred.

Example 10

FIGS. 14A and 14B show the scans corresponding to an interface where 30% by weight untreated carbon black was added at the PS/PS interface. FIG. 14A shows the topography and FIG. 14B shows the friction analysis or roughness of the interface. In this example, the fracture toughness ($G_c$) was found to be 32.6 J/m$^2$, which indicates that chain pull out was the probable mechanism of rupture. FIGS. 14A and 14B show that even though there is topographical contrast, little frictional contrast is seen. This is consistent with a weak interface where fracture occurs via chain pull out with minimal deformation.

Example 11

Figures 15A, 15B:
FIGS. 15A and 15B show the scanning probe microscopy scans for the interface between polystyrene layers (PS/PS) where 30% by weight treated carbon black was added to the polystyrene.

FIGS. 15A and 15B show the SPM images from an AFM analysis of PS/PS when 30% by weight carbon black heat treated at 2400° C. is added. Large friction contrast occurs again indicating the presence of crazes. This is consistent with the observed increase of $G_c$ to 82.4 J/m$^2$. FIG. 15A shows the topography at the interface and FIG. 15B shows the friction analysis or roughness of the interface.

Example 12

Figures 16A, 16B:
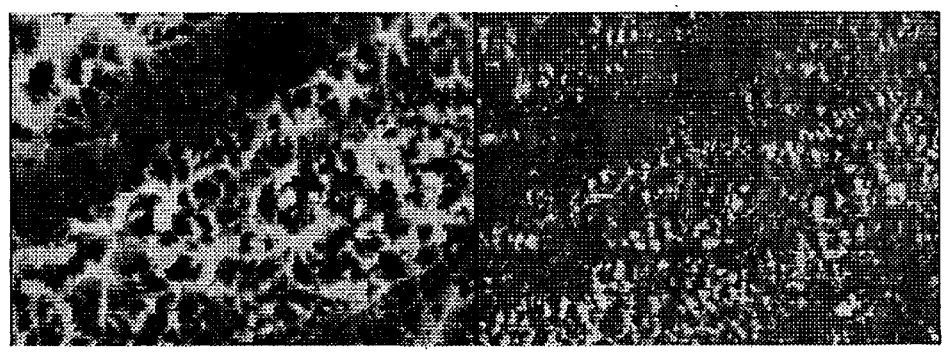
FIGS. 16A and 16B show the scanning probe microscopy scans for the interface between polystyrene layers (PS/PS) where 30% by weight untreated carbon black plus 10% by weight colloidal silica were added to the polystyrene.

A similar effect at the interface is seen in FIGS. 16A and 16B when 10% by weight colloidal silica is added to PS/PS with 30% by weight untreated carbon black. Large friction contrast is observed which indicates that crazing occurs again as fracture toughness, $G_c$, is increased from 32.6 to 159.2 J/m$^2$. FIG. 16A shows the topography at the interface and FIG. 16B shows the friction analysis or roughness of the interface.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A polymeric composition with enhanced adhesion comprising:
   a polymer;
   0.1 to 30% by weight of a carbon black filler; and
   0.1 to 5% by weight of a carbon filler or a hydrophobic silica, wherein said carbon filler is pure graphite particles or a heat treated carbon black filler.

2. The polymeric composition according to claim 1, wherein the polymer is a rubbery polymer or a glassy polymer.

3. The polymeric composition according to claim 1, wherein the polymer is polybutadiene, brominated isobutylene methylstyrene, polystyrene or polymethylmethacrylate.

4. The polymeric composition according to claim 1, wherein said heat treated carbon black filler is heat treated to an extent sufficient to reduce interaction with said polymer.

5. The polymeric composition according to claim 1, wherein said heat treated carbon black filler is heat treated at a temperature of at least 1100° C.

6. The polymeric composition according to claim 1 comprising 20 to 30% by weight of said carbon black filler.

7. The polymeric composition according to claim 1 comprising 1 to 3% by weight of said carbon filler.

8. A polymeric composition with enhanced adhesion comprising:
   a polymer, wherein said polymer is a rubbery polymer or a glassy polymer;
   20 to 30% by weight of a carbon black filler; and
   1 to 3% by weight of a carbon filler or a colloidal silica, wherein said carbon filler is pure graphite particles or a heat treated carbon black filler, heat treated to an extent sufficient to reduce interaction with said polymer.

9. The polymeric composition according to claim 8, wherein said polymer is polybutadiene, brominated isobutylene methylstyrene, polystyrene or polymethylmethacrylate.

10. A multilayer polymer structure comprising:
    a first layer that includes a first polymer;
    a second layer that includes a second polymer; and
    an adhesive layer that includes 0.1 to 30% by weight of a carbon black filler, 0.1 to 5% by weight of a carbon filler or a colloidal silica and a third polymer;
    wherein said adhesive layer is disposed between said first layer and said second layer.

11. The multilayer polymer structure of claim 10, wherein said third polymer is the same as said first polymer or said second polymer.

12. The multilayer polymer structure of claim 10, wherein said third polymer is polybutadiene, brominated isobutylene methylstyrene, polystyrene or polymethylmethacrylate.

13. The multilayer polymer structure of claim 12, wherein said third polymer is the same as said first polymer or said second polymer.

14. The multilayer polymer structure of claim 10, wherein said first polymer is polybutadiene, brominated isobutylene methylstyrene, polystyrene or polymethylmethacrylate and said second polymer is polybutadiene, brominated isobutylene methyistyrene, polystyrene or polymethylmethacrylate.

15. The multilayer polymer structure of claim 10, wherein said carbon filler is pure graphite particles.

16. The multilayer polymer structure of claim 10, wherein said carbon filler is a heat treated carbon black filler that is heat treated to an extent sufficient to reduce interaction with said third polymer.

17. The multilayer polymer structure of claim 10, wherein said multilayer polymer structure is annealed.

18. The multilayer polymer structure of claim 10, wherein said adhesive layer includes 20 to 30% by weight of a carbon black filler and 1 to 3% by weight of a carbon filler.

19. The multilayer polymer structure of claim 13, wherein said adhesive layer includes 20 to 30% by weight of a carbon black filler 1 and 3% by weight of a carbon filler.

20. The multilayer polymer structure of claim 19, wherein said multilayer polymer structure is annealed for at least 2 minutes.

21. A method for enhancing the adhesiveness of polymer mixtures which include a carbon black filler, the method comprising adding to a polymer mixture comprising a carbon black filler, a second filler comprising a hydrophobic silica, a colloidal silica in an amount of 0.1 to 3% by weight of said polymer mixture, pure graphite particles or a heat treated carbon black.

22. The method for enhancing the adhesiveness of polymer mixtures according to claim 21, wherein said heat treated carbon black is heat treated at a temperature of at least 1100° C.

23. The method for enhancing the adhesiveness of polymer mixtures according to claim 21, wherein said polymer mixture comprises 0.1 to 5% by weight of said hydrophobic silica, said pure graphite particles or said heat treated carbon black.

24. The method for enhancing the adhesiveness of polymer mixtures according to claim 21, wherein said polymer mixture comprises 0.1 to 30% by weight of said carbon black filler.

25. The method for enhancing the adhesiveness of polymer mixtures according to claim 21, wherein said polymer mixture comprises a rubbery or glassy polymer.

26. The method for enhancing the adhesiveness of polymer mixtures according to claim 21, wherein said polymer mixture comprises polybutadiene, brominated isobutylene methylstyrene, polystyrene or polymethylmethacrylate and said second polymer is polybutadiene, brominated isobutylene methylstyrene, polystyrene or polymethylmethacrylate.

27. A method for enhancing polymer adhesion in multilayer structures made from polymer mixtures which include a carbon black filler, the method comprising:
    adding to a polymer mixture comprising a carbon black filler, a second-filler comprising a colloidal silica, pure graphite particles or a heat treated carbon black to form an enhanced polymer mixture; and
    forming a multilayer polymer structure, wherein at least one of said layers comprises said enhanced polymer mixture;
    wherein said multilayer polymer structures have a higher fracture toughness than multilayer polymer structures formed from similar polymer mixtures without the second filler.

28. The method for enhancing polymer adhesion in multilayer structures according to claim 27, wherein the colloidal silica is a hydrophobic silica.

29. The method for enhancing polymer adhesion in multilayer structures according to claim 27, wherein said heat treated carbon black is heat treated at a temperature of at least 1100° C.

30. The method for enhancing polymer adhesion in multilayer structures according to claim 27, wherein said enhanced polymer mixture comprises 0.1 to 5% by weight of said second filler.

31. The method for enhancing polymer adhesion in multilayer structures according to claim 27, wherein said polymer mixture comprises 0.1 to 30% by weight of said carbon black filler.

32. The method for enhancing polymer adhesion in multilayer structures according to claim 27, wherein said polymer mixture comprises a rubbery or glassy polymer.

33. The method for enhancing polymer adhesion in multilayer structures according to claim 27, wherein said polymer mixture comprises polybutadiene, brominated isobutylene methylstyrene, polystyrene or polymethylmethacrylate and said second polymer is polybutadiene, brominated isobutylene methylstyrene, polystyrene or polymethylmethacrylate.

34. The method for enhancing polymer adhesion in multilayer structures according to claim 27, further comprising annealing said multilayer structure.

* * * * *

UNITED STATES PATENT AND TRADEMARK OFFICE
CERTIFICATE OF CORRECTION

PATENT NO. : 6,905,767 B2
DATED : June 14, 2005
INVENTOR(S) : Rafailovich et al.

It is certified that error appears in the above-identified patent and that said Letters Patent is hereby corrected as shown below:

Column 1,
Line 5, please add:
-- This invention was made with Government support under Grant No. DMR 0080604 awarded by the National Science Foundation. The Government has certain rights in the invention. --.

Signed and Sealed this

Twenty-seventh Day of September, 2005

JON W. DUDAS
*Director of the United States Patent and Trademark Office*